(12) United States Patent
Bonell et al.

(10) Patent No.: US 10,954,649 B2
(45) Date of Patent: *Mar. 23, 2021

(54) FLOATING MANHOLE COVER ASSEMBLY

(71) Applicant: NEENAH FOUNDRY COMPANY, Neenah, WI (US)

(72) Inventors: Ryan Bonell, Menasha, WI (US); Hassan Shokouhi, Neenah, WI (US)

(73) Assignee: Neenah Foundry Company, Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/284,765

(22) Filed: Feb. 25, 2019

(65) Prior Publication Data

US 2019/0186099 A1    Jun. 20, 2019

Related U.S. Application Data

(63) Continuation of application No. 15/491,541, filed on Apr. 19, 2017, now Pat. No. 10,233,609.

(51) Int. Cl.
*E02D 29/14*    (2006.01)
*E02D 29/12*    (2006.01)

(52) U.S. Cl.
CPC ....... *E02D 29/1409* (2013.01); *E02D 29/121* (2013.01); *E02D 29/149* (2013.01); *E02D 2200/1685* (2013.01); *E02D 2200/1692* (2013.01); *E02D 2250/0007* (2013.01); *E02D 2300/0001* (2013.01);

(Continued)

(58) Field of Classification Search
CPC . E02D 29/1409; E02D 29/121; E02D 29/149; E02D 2200/1685; E02D 2200/1692; E02D 2250/0007; E02D 2300/0001; E02D 2300/002; E02D 2450/00; E02D 2600/30

See application file for complete search history.

(56) References Cited

U.S. PATENT DOCUMENTS

| 599,441 A * | 2/1898 | Dorr .................. E02D 29/1409 |
| | | 404/26 |
| 897,048 A | 8/1908 | Astfalck |
| 737,667 A | 9/1908 | Schunck |

(Continued)

FOREIGN PATENT DOCUMENTS

| DE | 28 26 082 | 6/1978 |
| EP | 0 305 245 | 3/1989 |

(Continued)

OTHER PUBLICATIONS

Final Office Action on U.S. Appl. No. 15/491,541 dated Jun. 4, 2018.

(Continued)

*Primary Examiner* — Abigail A Risic
(74) *Attorney, Agent, or Firm* — Foley & Lardner LLP

(57) ABSTRACT

A manhole cover assembly comprises a base frame, the base frame comprising a base body and a base flange extending laterally outward from the base body. The assembly further comprises a top frame, the top frame comprising a top body disposed annularly about at least a portion of the base body, a top flange extending laterally outward from the top body, and a lip extending laterally inward from the top body.

20 Claims, 5 Drawing Sheets

(52) U.S. Cl.
CPC .... *E02D 2300/002* (2013.01); *E02D 2450/00* (2013.01); *E02D 2600/30* (2013.01)

(56) References Cited

U.S. PATENT DOCUMENTS

| | | | |
|---|---|---|---|
| 969,881 A | 9/1910 | Willia Klemm | |
| 1,076,386 A * | 10/1913 | O'Day | E02D 29/1409 404/26 |
| 1,458,391 A | 6/1923 | Burton | |
| 1,616,298 A | 2/1927 | Arnett | |
| 1,902,731 A | 3/1933 | Sherman | |
| 2,113,747 A | 4/1938 | Roedding et al. | |
| 2,436,016 A | 2/1948 | Myers | |
| 2,466,993 A | 4/1949 | Lickteig | |
| 2,927,812 A | 3/1960 | Smith et al. | |
| 2,987,908 A | 6/1961 | Pelcin | |
| 3,182,581 A | 5/1965 | Von Poederoyen et al. | |
| 3,530,696 A | 9/1970 | Dunmire | |
| 3,729,771 A | 5/1973 | Crane et al. | |
| 3,871,198 A | 3/1975 | Miller | |
| 3,970,343 A | 7/1976 | Horn | |
| 4,145,259 A | 3/1979 | Leumann | |
| 4,337,005 A * | 6/1982 | LeBaron | E02D 29/14 210/165 |
| 4,461,597 A | 7/1984 | Laurin | |
| 4,739,896 A | 4/1988 | Moss | |
| 4,750,569 A | 6/1988 | Flogaus | |
| 4,906,128 A * | 3/1990 | Trudel | E02D 29/1409 404/25 |
| 4,925,221 A | 5/1990 | Carmody et al. | |
| 4,928,615 A | 5/1990 | Williams | |
| 5,211,504 A * | 5/1993 | Trudel | E02D 29/1409 404/26 |
| 5,344,253 A * | 9/1994 | Sacchetti | E02D 29/1409 404/25 |
| 5,360,131 A | 11/1994 | Phillipps et al. | |
| 5,451,119 A * | 9/1995 | Hondulas | E02D 29/1409 404/25 |
| 5,465,862 A | 11/1995 | Devlin | |
| 5,525,006 A * | 6/1996 | Kilman | E02D 29/12 404/25 |
| 5,533,641 A | 7/1996 | Argandona | |
| 5,788,406 A * | 8/1998 | Hernandez | E02D 29/1409 404/25 |
| 5,950,368 A * | 9/1999 | Bradford | E02D 29/1418 220/484 |
| 6,125,508 A | 10/2000 | Formenti | |
| 6,199,414 B1 | 3/2001 | Chang | |
| 6,266,928 B1 | 7/2001 | Argandona | |
| 6,311,433 B1 | 11/2001 | Zdroik | |
| 6,616,370 B1 | 9/2003 | Signorelli | |
| 6,763,967 B2 | 7/2004 | Calder | |
| 6,764,261 B1 | 7/2004 | Stadler | |
| 6,811,119 B1 | 11/2004 | Petersen et al. | |
| 6,851,225 B1 | 2/2005 | Haar et al. | |
| 6,913,297 B2 | 7/2005 | Jackson et al. | |
| 6,951,318 B1 | 10/2005 | Petersen et al. | |
| 7,128,496 B2 | 10/2006 | Rogers et al. | |
| 7,223,051 B1 | 5/2007 | Vought et al. | |
| 7,243,515 B2 | 7/2007 | Meyer | |
| 7,484,908 B2 | 2/2009 | Stadler | |
| 7,704,010 B2 | 4/2010 | Nolle et al. | |
| 7,712,995 B2 | 5/2010 | Stadler | |
| 7,798,742 B2 | 9/2010 | Nolle et al. | |
| 7,887,252 B1 * | 2/2011 | Wang | E02D 29/1427 404/25 |
| 7,891,904 B2 | 2/2011 | Stadler | |
| 7,896,574 B2 | 3/2011 | Nolle et al. | |
| 8,220,298 B2 | 7/2012 | Burke et al. | |
| 8,449,216 B2 * | 5/2013 | Vrondran | E02D 29/1463 404/25 |
| 8,674,830 B2 | 3/2014 | Lanham et al. | |
| 8,784,000 B2 | 7/2014 | Reynolds et al. | |
| 8,888,400 B2 | 11/2014 | Nolle et al. | |
| 9,127,431 B2 | 9/2015 | Lanham et al. | |
| 9,157,212 B2 | 10/2015 | Nolle et al. | |
| 9,340,948 B2 | 5/2016 | Allen et al. | |
| 9,416,516 B2 | 8/2016 | Stadler | |
| 9,771,702 B2 | 9/2017 | Han | |
| 9,909,275 B2 | 3/2018 | Burr | |
| 9,915,052 B2 | 3/2018 | Shokouhi | |
| 2005/0285412 A1 | 12/2005 | Kim | |
| 2006/0255596 A1 | 11/2006 | Yong | |
| 2009/0255183 A1 | 10/2009 | Nolle et al. | |
| 2010/0193293 A1 * | 8/2010 | Murray | E02D 29/1418 182/93 |
| 2010/0281778 A1 * | 11/2010 | Loya-Morales | E02D 29/1409 49/394 |
| 2011/0025074 A1 | 2/2011 | Reznar | |
| 2011/0222964 A1 * | 9/2011 | Lacroix | E02D 29/14 404/26 |
| 2012/0020728 A1 * | 1/2012 | Royer | E02D 29/14 404/25 |
| 2013/0195549 A1 * | 8/2013 | Fier | E02D 29/14 404/26 |
| 2013/0221688 A1 | 8/2013 | Stadler | |
| 2014/0250794 A1 * | 9/2014 | Reynolds | E02D 29/1409 49/504 |
| 2015/0076835 A1 | 3/2015 | Mitchell et al. | |
| 2015/0104254 A1 | 4/2015 | Minarovic | |
| 2016/0097181 A1 | 4/2016 | Allen et al. | |
| 2016/0289912 A1 | 10/2016 | Smith | |
| 2016/0289913 A1 | 10/2016 | Canney et al. | |
| 2017/0081821 A1 | 3/2017 | Shokouhi | |

FOREIGN PATENT DOCUMENTS

| | | |
|---|---|---|
| EP | 0 737 782 | 10/1996 |
| EP | 0 856 611 A1 | 8/1998 |
| EP | 1 526 236 | 8/2004 |
| EP | 2 987 915 A1 | 2/2016 |
| FR | 2685716 | 7/1993 |
| JP | 2000-120096 A | 4/2000 |
| JP | 2004-011247 A | 1/2004 |
| JP | 2005-290731 A | 10/2005 |
| JP | 2007-224687 A | 9/2007 |
| JP | 2008-038542 | 2/2008 |
| KR | 101156757 | 3/2011 |
| WO | WO-2015/006559 A1 | 1/2015 |

OTHER PUBLICATIONS

U.S. Office Action on U.S. Appl. No. 15/491,541 dated Jan. 26, 2018.
Non-Final Office Action on U.S. Appl. No. 15/835,589 dated Aug. 9, 2019.
Search Report from corresponding UK Application No. GB1615657.2, dated Feb. 20, 2017, pp. 1-2.
Search Report issued in Great Britain application No. GB1615654.9, dated Dec. 15, 2016.
U.S. Office Action on U.S. Appl. No. 15/267,903 dated Apr. 6, 2017.
Non-Final Office Action from U.S. Appl. No. 15/835,589, dated Jul. 21, 2020.
Non-Final Office Action for U.S. Appl. No. 15/874,584, dated Jan. 13, 2020.
Final Office Action for U.S. Appl. No. 15/835,589, dated Jan. 16, 2020.
Final Office Action for U.S. Appl. No. 15/874,584, dated Jul. 14, 2020.

* cited by examiner

US 10,954,649 B2

FLOATING MANHOLE COVER ASSEMBLY

CROSS-REFERENCE TO RELATED APPLICATIONS

This application is a continuation from U.S. patent application Ser. No. 15/491,541, filed on Apr. 19, 2017, the content of which is incorporated by reference in its entirety.

TECHNICAL FIELD

The present application relates generally to the field of manhole cover assemblies. The present application relates more specifically to floating manhole cover assemblies.

BACKGROUND

A manhole provides access to an underground passage or confined area through a manhole structure. The underground passage or confined area may contain public utility equipment, such as sewer lines, storm drains, electrical and telecommunication cables, etc. A manhole cover is a removable plate that forms a lid over the opening of a manhole. Manhole covers are used to prevent individuals and objects from falling into the manhole, as well as to prevent unauthorized access into the manhole.

In some installations, a surface (e.g., street, sidewalk, etc.) may be inclined relative to the manhole structure. In order to provide access to the manhole structure, a conventional floating manhole cover assembly includes a two-part structure with a lower frame attached to the manhole structure and a separate upper frame inserted inside the lower frame and "floating" in the lower frame, such that the upper frame may move relative to the lower frame.

In a conventional floating manhole cover assembly, the lower frame interacts with the ground surrounding the manhole structure and only a limited portion of the upper frame (e.g., the portion not inside the lower frame) interacts with the ground.

SUMMARY

One embodiment relates to a manhole cover assembly. The manhole cover assembly comprises a base frame, the base frame comprising a base body and a base flange extending laterally outward from the base body. The assembly further comprises a top frame, the top frame comprising a top body disposed annularly about at least a portion of the base body, a top flange extending laterally outward from the top body, and a lip extending laterally inward from the top body.

Another embodiment relates to a manhole cover assembly. The manhole cover assembly comprises a pavement structure and a base frame, the base frame comprising a base body and a base flange extending laterally outward from the base body. The manhole cover assembly further comprises a top frame disposed in the pavement structure, the top frame comprising a top body disposed annularly about at least a portion of the base body, a top flange extending laterally outward from the top body, and a lip extending laterally inward from the top body.

Another embodiment relates to a method of installing a manhole cover assembly. The method comprises providing a base frame, the base frame comprising a base body and a base flange extending laterally outward from the base body, and coupling the base flange to a manhole structure. The method further comprises providing a top frame, the top frame the top frame comprising a top body and a top flange extending laterally outward from the top body, and positioning the top body annularly about the base body. The method further comprises pouring a pavement structure about the top frame.

DETAILED DESCRIPTION

Figure 1:
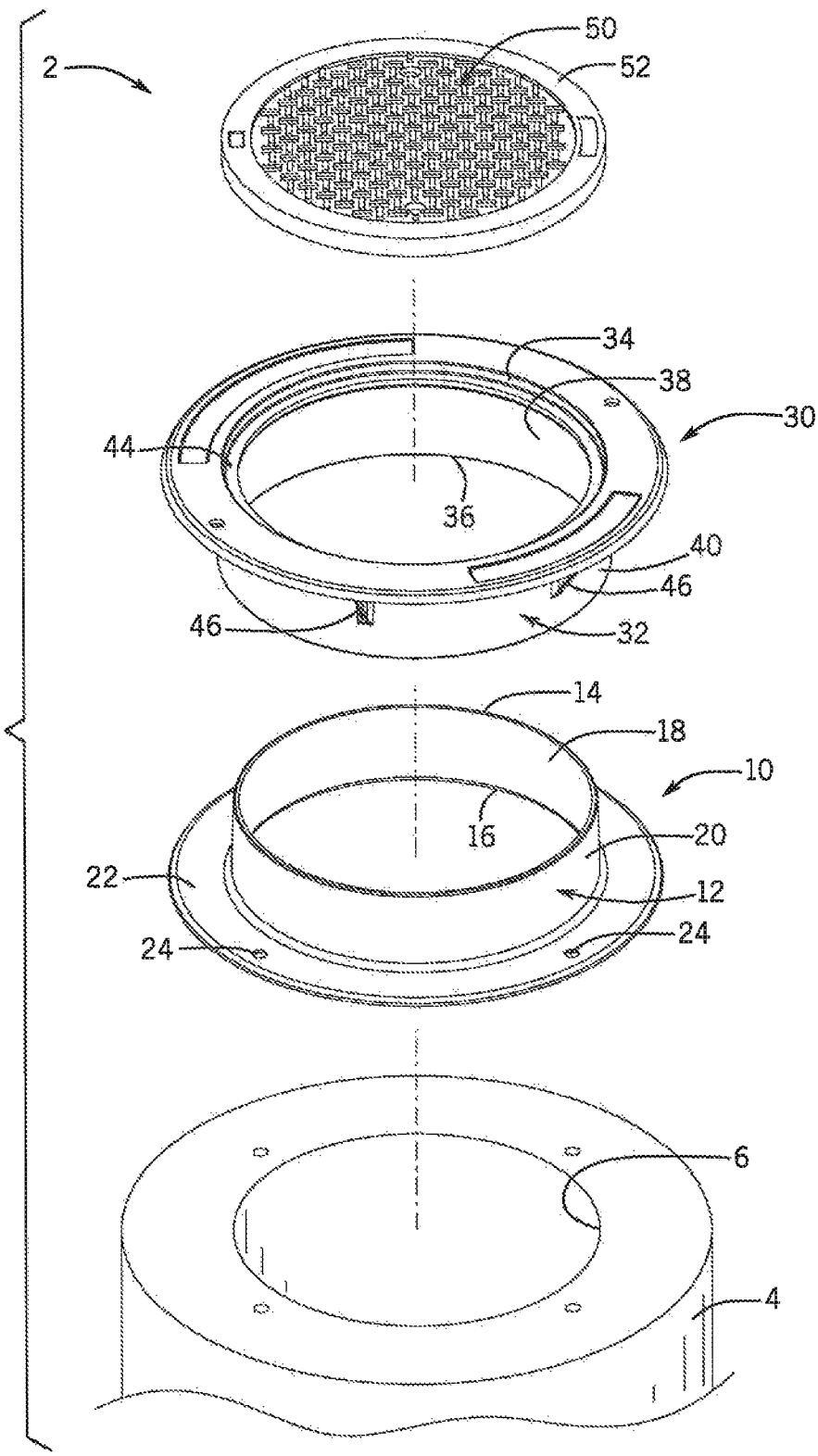
FIG. 1 is an exploded view of a manhole cover assembly installed on a manhole structure, according to an exemplary embodiment.

Referring to FIG. 1, a manhole cover assembly 2 includes a base frame 10, a top frame 30, and a cover 50. The manhole cover assembly 2 may be disposed on a manhole structure 4 and is configured to provide access to the manhole structure 4 through a surface (e.g., street, sidewalk, etc.), while improving the structural interaction between the manhole assembly and the surface. The manhole structure 4 defines an opening 6 extending into a passage and configured to be large enough for a person to pass therethrough. The manhole structure 4 may provide access from above the surface, through the opening 6, to the passage or other space below the surface. FIG. 1 shows a generally circular opening 6, although according to other exemplary embodiments, the opening 6 may define other shapes. For example, the opening 6 may be configured to corresponding with a shape of the base frame 10 for coupling the base frame 10 to the manhole structure 4.

Figure 2:
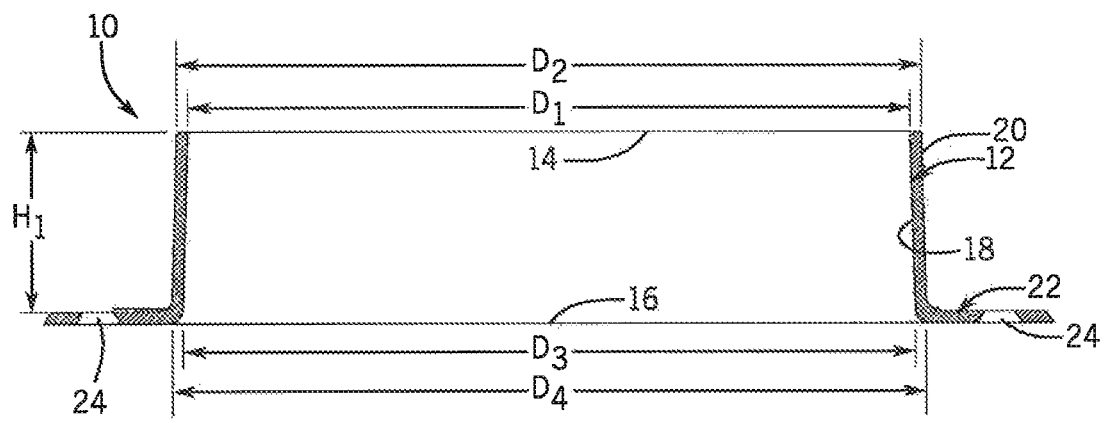
FIG. 2 is a cross-sectional view of a base frame of the manhole cover assembly of FIG. 1.

The base frame 10 includes a generally annular base body 12 having an upper (e.g., first) end 14, a lower (e.g., second) end 16, an inner surface 18, and an outer surface 20. A base flange 22 extends laterally outwardly from (e.g., orthogonally to) the outer surface 20 of the base body 12. As shown in FIGS. 1 and 2, the base flange 22 extends from the lower end 16 of the base body 12, although according to other exemplary embodiments, the base flange 22 may extend from the outer surface 20 of the base body 12 at other heights, such that at least a portion of the base body 12 is disposed above the base flange 22 (e.g., between the base flange 22 and the upper end 14 of the base body 12).

A plurality of openings or holes 24 are defined annularly about the base flange 22 and extend therethrough. In the embodiment shown in FIG. 1, the base flange 22 includes four holes 24, although the base flange 22 may include more or fewer holes 24. The base frame 10 is configured to be coupled to the manhole structure 4 by inserting a bolt or other fastener through a hole 24 into threaded or other engagement with the manhole structure 4 (e.g., a threaded opening). According to other exemplary embodiments, the base frame 10 may be coupled to the manhole structure 4 or other structure in other ways (e.g., welding, riveting, interference fit, etc.).

Figure 3:
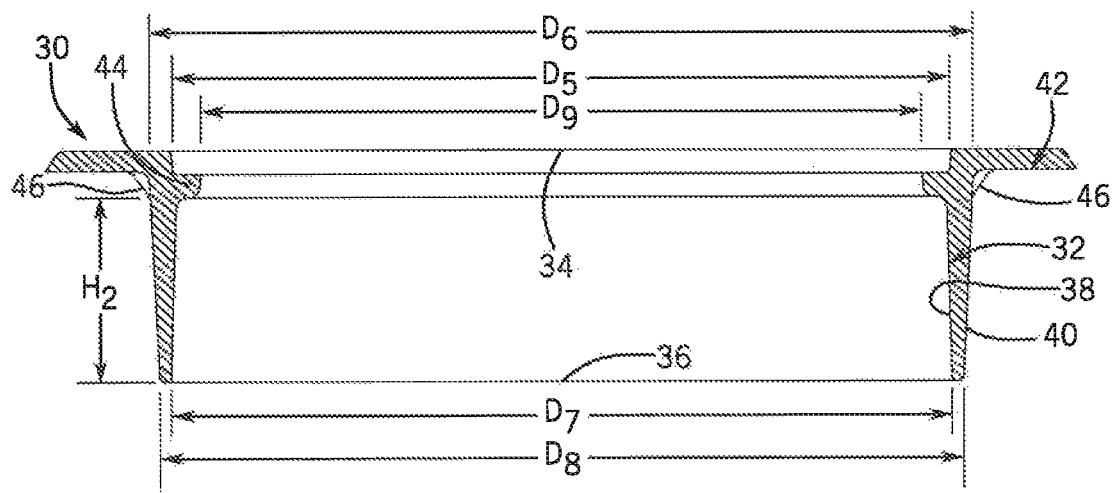
FIG. 3 is a cross-sectional view of a top frame of the manhole cover assembly of FIG. 1.

Referring still to FIG. 1, the top frame 30 includes a generally annular top body 32 having an upper (e.g., first) end 34, a lower (e.g., second) end 36, an inner surface 38, and an outer surface 40. A top flange 42 extends laterally outwardly from (e.g., orthogonally to) the outer surface 40 of the top body 32. As shown in FIGS. 1 and 3, the top flange 42 extends from the upper end 34 of the top body 32, although according to other exemplary embodiments, the top flange 42 may extend from the outer surface 40 of the top body 32 at other heights, such that at least a portion of the top body 32 is disposed below the top flange 42 (e.g., between the top flange 42 and the lower end 36 of the top body 32).

A lip 44 (e.g., a shoulder, projection, etc.) extends laterally inwardly from (e.g., orthogonally to) the inner surface 38 of the top body 32. The lip 44 extends proximate to and offset from the upper end 34 of the top body 32 and is configured to receive the cover 50. For example, the cover 50 may define an upper surface 52 and an opposing lower surface 54. When the cover 50 is received at the upper end 34 of the top body 32, the lower surface 54 engages the lip 44, preventing the cover 50 from passing further into the top body 32. The lip 44 may be spaced apart from the upper end 34 of the top body 32, such that the upper surface 52 of the cover is substantially coplanar with the upper end 34 of the top body 32 and/or with the top flange 42. For example, the lip 44 may be spaced apart from the upper end 34 by a distance substantially the same as a thickness of the cover 50.

Referring now to FIG. 2, a cross-sectional view of the base frame 10 of the manhole cover assembly 2 of FIG. 1 is shown. As shown in FIG. 2, proximate the upper end 14, the inner surface 18 of the base body 12 defines an upper inner diameter $D_1$ and the outer surface 20 defines an upper outer diameter $D_2$. Similarly, proximate the base flange 22, the inner surface 18 defines a lower inner diameter $D_3$ and the outer surface 20 defines a lower outer diameter $D_4$. The upper inner diameter $D_1$ may be large enough for a person to pass therethrough. For example, the upper inner diameter $D_1$ may be between 18 and 30 inches, or approximately 24 inches. As used herein, "approximately" is intended to encompass amounts plus or minus five percent of the given number, and all ranges are intended to be inclusive unless otherwise noted. The upper inner diameter $D_1$ may be less than the lower inner diameter $D_3$, such that the inner surface 18 forms a conical shape that increases in diameter moving from the upper end 14 of the base body 12 toward the base flange 22. Similarly, the upper outer diameter $D_2$ may be less than the lower outer diameter $D_4$, such that the outer surface 20 forms a conical shape that increases in diameter moving from the upper end 14 of the base body 12 toward the base flange 22. According to another exemplary embodiment, the upper and lower inner diameters $D_1$, $D_3$ may be substantially the same, forming a generally cylindrical inner surface 18 and/or the upper and lower outer diameters $D_2$, $D_4$ may be substantially the same, forming a generally cylindrical outer surface 20. The base body 12 may define a substantially constant thickness. For example, the difference between the inner diameters $D_1$, $D_3$ and the outer diameters $D_2$, $D_4$, may be substantially the same. According to other exemplary embodiments, the thickness of the base body 12 may vary at different positions along the base body 12.

The base body 12 extends above the base flange 22 by a base flange height $H_1$. The base flange height $H_1$ may be between 6 and 12 inches and preferably between 6 and 8 inches. The base body 12 and the base flange 22 may be integrally formed although according to other exemplary embodiments, the base body 12 and the base flange 22 may be separately formed and joined (e.g., welded).

Referring now to FIG. 3, a cross-sectional view of the top frame 30 of the manhole cover assembly 2 of FIG. 1 is shown. As shown in FIG. 3, proximate (e.g., below) the lip 44, the inner surface 38 of the top body 32 defines an upper inner diameter $D_5$ and the outer surface 40 defines an upper outer diameter $D_6$. Similarly, proximate the lower end 36, the inner surface 38 defines a lower inner diameter $D_7$ and the outer surface 40 defines a lower outer diameter $D_8$. The upper inner diameter $D_5$ may be less than the lower inner diameter $D_7$, such that the inner surface 38 forms a conical shape that increases in diameter moving from the upper end 34 of the top body 32 toward the lower end 36. Similarly, the upper outer diameter $D_6$ may be less than the lower outer diameter $D_8$, such that the outer surface 40 forms a conical shape that increases in diameter moving from the upper end 34 of the top body 32 toward the lower end 36. According to another exemplary embodiment, the upper and lower inner diameters $D_5$, $D_7$ may be substantially the same, forming a generally cylindrical inner surface 38 and/or the upper and lower outer diameters $D_6$, $D_8$ may be substantially the same, forming a generally cylindrical outer surface 40. The top body 32 may define a thickness that varies at different positions along the top body 32. For example, the thickness may decrease moving from the upper end 34 to the lower end 36. According to other exemplary embodiments, the thickness of the top body 32 may be substantially constant. For example, the difference between the inner diameters $D_5$, $D_7$ and the outer diameters $D_6$, $D_8$, may be substantially the same.

The lip 44 defines a lip diameter (e.g., inner diameter) $D_9$ configured to be large enough for a person to pass therethrough. For example, the lip diameter $D_9$ may be between 18 and 30 inches, or approximately 24 inches. The lip diameter $D_9$ may be substantially the same as the upper inner diameter $D_1$ of the base frame 10. The lip diameter $D_9$ is less than an outer diameter of the cover 50, such that the lip 44 holds the cover 50 in place proximate the upper end 34 of the top body 32.

The top body 32 extends below the lip 44 by a lip height $H_2$. The lip height $H_2$ may be between 6 and 12 inches and preferably between 6 and 8 inches. The lip height $H_2$ may be substantially the same as the base flange height $H_1$, although according to other exemplary embodiments, the lip height $H_2$ may be less than or greater than the base flange height $H_1$. The top body 32 and the top flange 42 may be integrally formed (e.g., molded via a single mold to form a single component) although according to other exemplary embodiments, the top body 32 and the top flange 42 may be separately formed and joined (e.g., welded).

Figure 4:
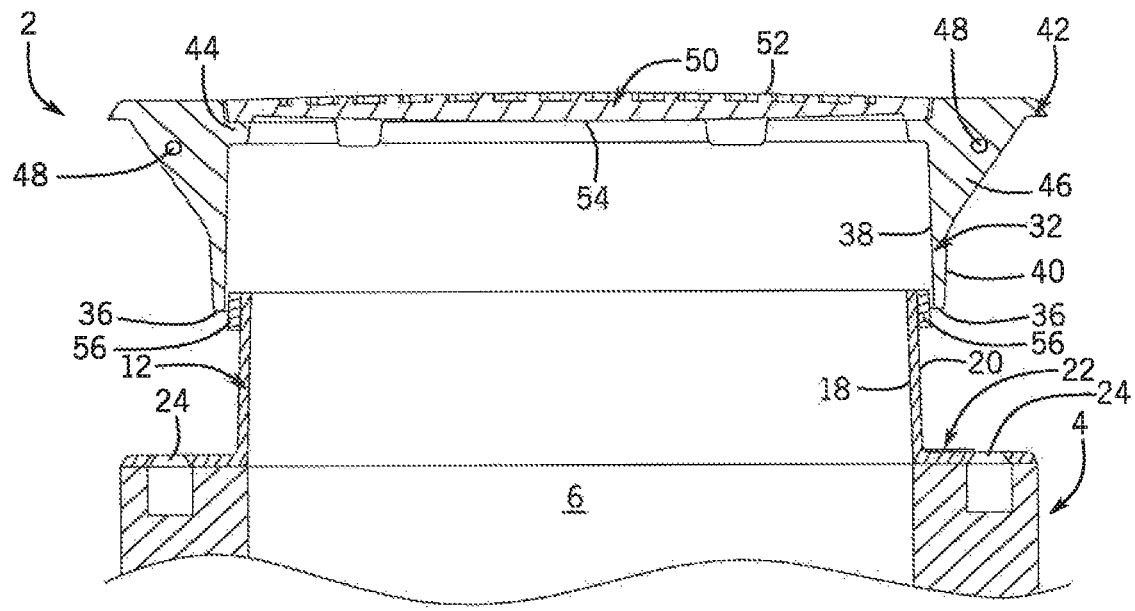
FIG. 4 is a cross-sectional view of the top frame being installed on the base frame in a first position, according to an exemplary embodiment.

Referring now to FIGS. 1 and 4, the manhole cover assembly 2 is shown. The top frame 30 includes a plurality of gussets 46 (e.g., buttresses) extending between and generally orthogonal to the top flange 42 and the outer surface 40 of the top body 32. The gussets 46 provide additional structural rigidity to the top flange 42, preventing damage to the top flange 42 when loads are applied thereto. For example, when a vehicle drives over the top flange 42, the gussets 46 prevent the top flange 42 from bending downward toward the lower end 36 of the top body 32. As shown in FIG. 4, the gussets 46 may be integrally formed with the top body 32 and/or the top flange 42, although according to other exemplary embodiments, the gussets 46 may be separately formed and joined (e.g., welded) thereto.

Figure 5:
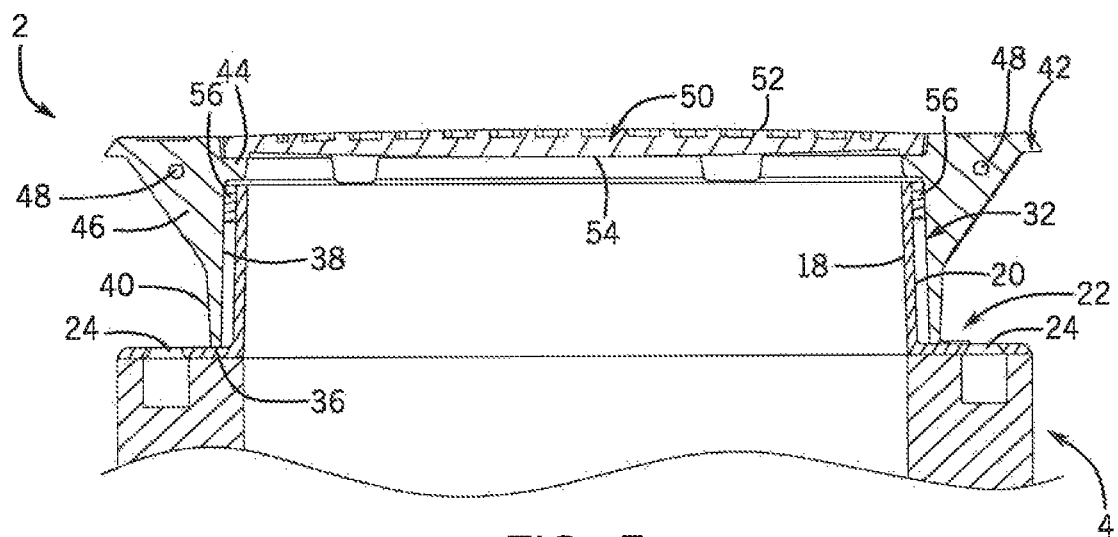
FIG. 5 is a cross-sectional view of the top frame being installed on the base frame in a second position.
Figure 6:
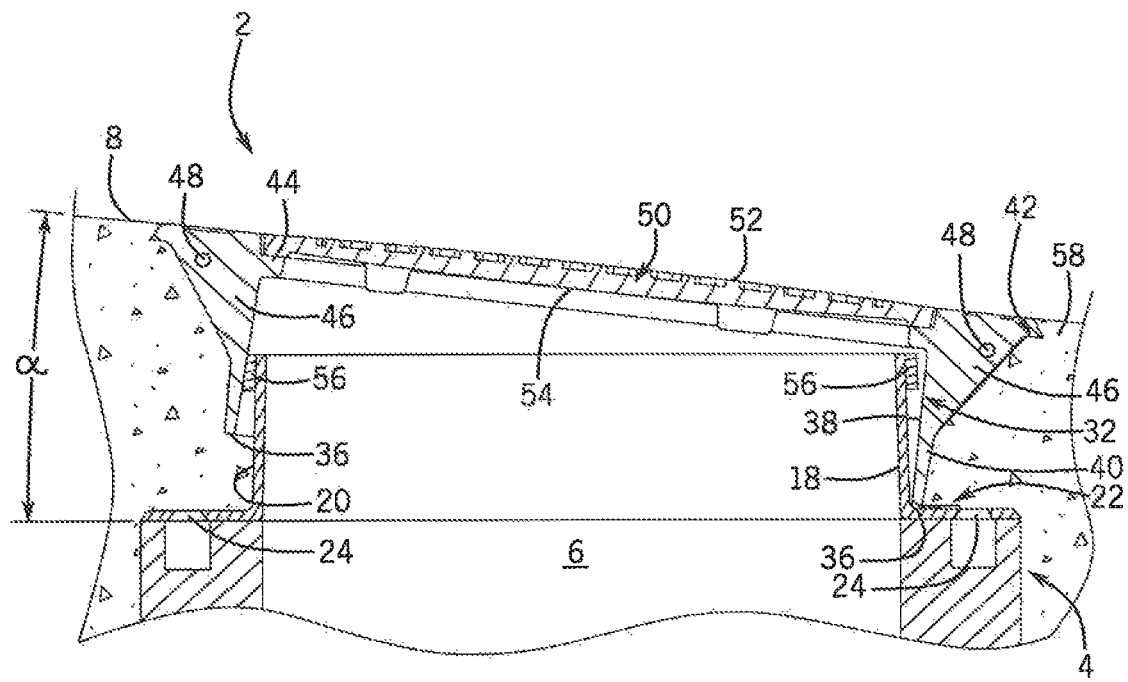
FIG. 6 is a cross-sectional view of the top frame being installed on the base frame in a tilted orientation.

Referring now to FIGS. 4-6, each gusset 46 may include at least one anchor hole 48 (e.g., opening). The anchor holes 48 may be configured to receive an anchor therethrough. For example, the anchor may include reinforcing bar (i.e., rebar). In some embodiments, a first portion of the anchor is inserted into and disposed within a corresponding anchor hole 48. The anchor holes 48 may have a diameter of approximately 0.75 inches or another diameter greater than a diameter of the anchor. A second portion of the anchor extends away from the gusset 46 and is configured to be received within a pavement structure 58, which is shown in FIG. 6 and described in further detail below. The second portion of the anchor may be held within the pavement structure 58 once the pavement structure 58 is poured, further securing the top frame 30 in a fixed position within the pavement structure 58.

Referring generally to FIGS. 4-6, the top frame 30 is shown being installed on the base frame 10, according to an exemplary embodiment. Referring now to FIG. 4, the manhole cover assembly 2 is shown with the top frame 30 in a first (e.g., raised) position over the base frame 10, such that the upper end 14 of the base body 12 is received within the lower end 36 of the top body 32. In this configuration, the lower inner diameter $D_7$ of the top body 32 is greater than the upper outer diameter $D_2$ of the base body 12, such that the top frame 30 may be lowered onto the base frame 10. A gasket 56 (e.g., first member, sealing member, spacer, etc.) is disposed annularly about the outer surface 20 of the base frame 10 proximate to the upper end 14 thereof and is configured to extend between and engage the outer surface 20 of the base frame 10 and the inner surface 38 of the top frame 30. The gasket 56 may be configured to provide sealing or other engagement between the base frame 10 and the top frame 30. For example, the gasket 56 may prevent various fluids from escaping from the manhole structure 4 through the manhole cover assembly 2 or fluids from entering the manhole structure 4 through the manhole cover assembly 2 when the top frame 30 and the cover 50 are installed on the base frame 10. The gasket 56 is coupled to the base frame 10, such that the gasket 56 remains in place relative to the base frame 10 as the top frame 30 is moved. The gasket 56 may be formed from a compressible material (e.g., neoprene, rubber, etc.) or other suitable material configured to provide sealing engagement between the base frame 10 and the top frame 30. According to another exemplary embodiment, the gasket 56 may be coupled to the inner surface 38 of the top frame 30, such that the gasket 56 remains in place relative to the top frame 30 as the top frame 30 is moved around the base frame 10.

Referring to FIG. 5, the manhole cover assembly 2 is shown with top frame 30 in a second (e.g., lowered) position around the base frame 10. In this configuration, the upper end 14 of the base body 12 is disposed proximate and/or engages the lip 44 of the top frame 30. Similarly, the lower end 36 of the top body 32 is disposed proximate to and/or engages the base flange 22. In this configuration, the base flange height $H_1$ and the lip height $H_2$ may be substantially the same. While FIG. 5 shows both the base body 12 engaging the lip 44 and the top body 32 engaging the base flange 22, according to other exemplary embodiments, the base body 12 may not engage the lip 44 and/or the top body 32 may not engage the base flange 22 when the top frame 30 is in the lowered position on the base frame 10. For example, where the base flange height $H_1$ is greater than the lip height $H_2$, the upper end 14 of the base body 12 may engage the lip 44 while the lower end 36 of the top body 32 is spaced apart from the base flange 22. In contrast, where the base flange height $H_1$ is less than the lip height $H_2$, the lower end 36 of the top body 32 may engage the base flange 22, while the upper end 14 of the base body 12 is spaced apart from the lip 44.

The lower inner diameter $D_7$ of the top body 32 is greater than the lower outer diameter $D_4$ of the base body 12, such that the top frame 30 may be lowered fully onto the base frame 10. The difference between the lower inner diameter $D_7$ of the top body 32 and the lower outer diameter $D_4$ of the base body 12 may be substantially the same as or different than the difference between the upper inner diameter $D_5$ of the top body 32 and the upper outer diameter $D_2$ of the base body 12.

Referring now to FIG. 6, the manhole cover assembly 2 is shown with the top frame 30 positioned about the base frame 10 in a tilted (e.g., inclined) orientation. When the manhole cover assembly 2 is installed for use with an inclined surface 8 (e.g., street, sidewalk, etc.), the underlying manhole structure 4 may have a different (e.g., level) orientation. In order to provide access to the opening 6 in the manhole structure 4, the base frame 10 may be coupled to the manhole structure 4 and the top frame 30 may be oriented at an angle relative to the base frame 10 and generally planar with the surface 8. For example, the surface 8 defines an incline angle α relative to the manhole structure 4 and the top flange 42 defines the same incline angle α relative to the base flange 22. The incline angle α may be between 0° and 10° and preferably less than or equal to approximately 7°, although the incline angle α may vary according to other exemplary embodiments.

As shown in FIG. 6, when the top frame 30 is installed at the incline angle α, a portion of the inner surface 38 may engage the gasket 56, while another portion of the inner surface 38 is disengaged from the gasket 56. The portion of the gasket 56 engaging the inner surface 38 may be compressed, forming sealing engagement between the top frame 30 and the gasket 56. This sealing engagement is configured to prevent material from entering an interior portion of the manhole cover assembly 2 when area around the manhole cover assembly 2 is being filled during construction. For example, when the manhole cover assembly 2 is installed in a street, asphalt, concrete, or other suitable material (e.g., infill material) may be poured around the manhole cover assembly 2 as shown in stippled shading in FIG. 6, to form the pavement structure 58 (e.g., ground). The material is prevented from entering the manhole cover assembly 2 between the base frame 10 and the top frame 30 due, at least in part, to the sealing engagement between the base frame 10, the top frame 30, and the gasket 56.

While FIG. 6 shows a portion of the gasket 56 disengaged from the top frame 30, the gasket 56 may be sized, such that the gasket 56 engages the inner surface 38 of the top frame 30 substantially around the entire circumference base body 12. In this configuration, the gasket 56 may provide complete sealing engagement between the base frame 10 and the top frame 30 at any incline angle α or vertical position of the top frame 30 on the base frame 10.

When the gasket 56 engages the inner surface 38 of the top frame 30, the gasket 56 provides frictional engagement for holding the top frame 30 at the incline angle α as the material is poured around the manhole cover assembly 2.

As shown in FIGS. 4-6, the top body 32 is disposed annularly about (e.g., outward from) the base body 12. As shown in FIG. 6, both the top flange 42 and the top body 32 engage (e.g., interact with) the pavement structure 58 surrounding the manhole cover assembly 2 for transferring loads from the top frame 30 to the pavement structure 58. It may be advantageous to provide a manhole cover assembly that maximizes the interaction between the top frame 30 and the surrounding pavement structure 58. For example, by positioning the top body 32 external to the base body 12, the top frame 30 is configured to withstand higher loads (e.g., from vehicles driving over the manhole cover assembly 2) than if the entire base frame 10 and only the top flange 42 of the top frame 30 engaged the pavement structure 58. Furthermore, the increased contact area between the top frame 30 and the pavement structure 58 may result in decreasing the thickness or other dimensions of the top frame 30 and therefore the amount of material used to form the top frame 30 may be reduced. Similarly, because engagement between the base body 12 and the pavement structure 58 is reduced or eliminated, the static loads placed on the base frame 10 are reduced, such that the material used to form the base frame 10 may be reduced. As the pavement structure 58 moves (e.g., due to settling, changes in incline angle α, etc.), the base frame 10 is further isolated from the pavement structure 58, reducing stresses (e.g., loads) on the connection between the base flange 22 and the manhole structure 4. For example, rather than the pavement structure 58 moving the base frame 10, the top frame 30 moves about the base frame 10, corresponding with the changes in the pavement structure 58.

Figure 7:
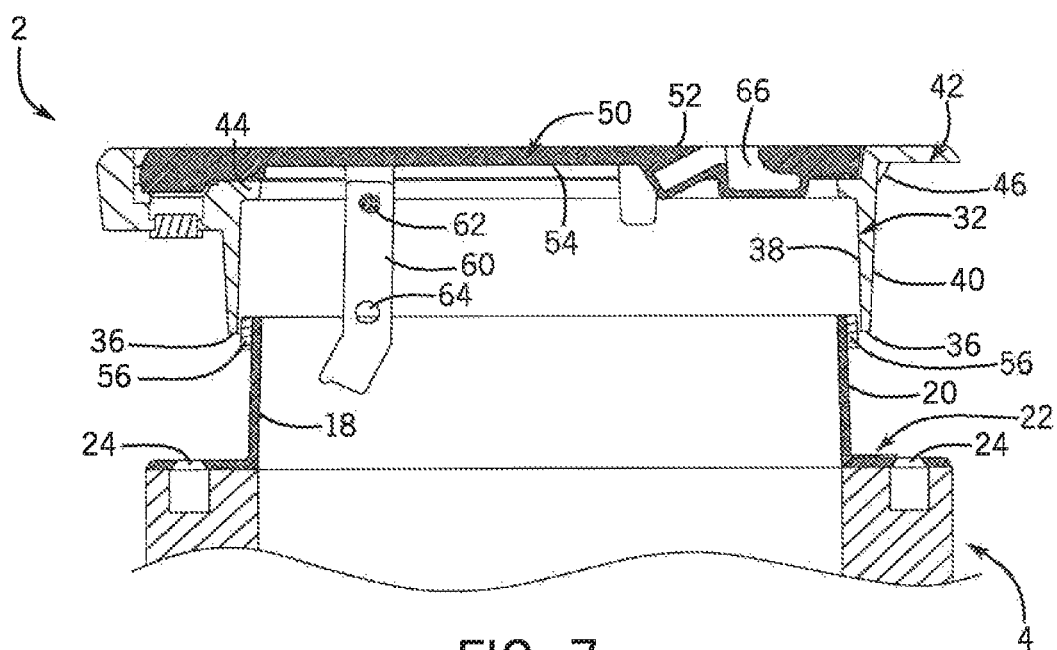
FIG. 7 is a cross-sectional view of the top frame with a hinged cover being installed on the base frame in the first position, according to an exemplary embodiment.
Figure 8:
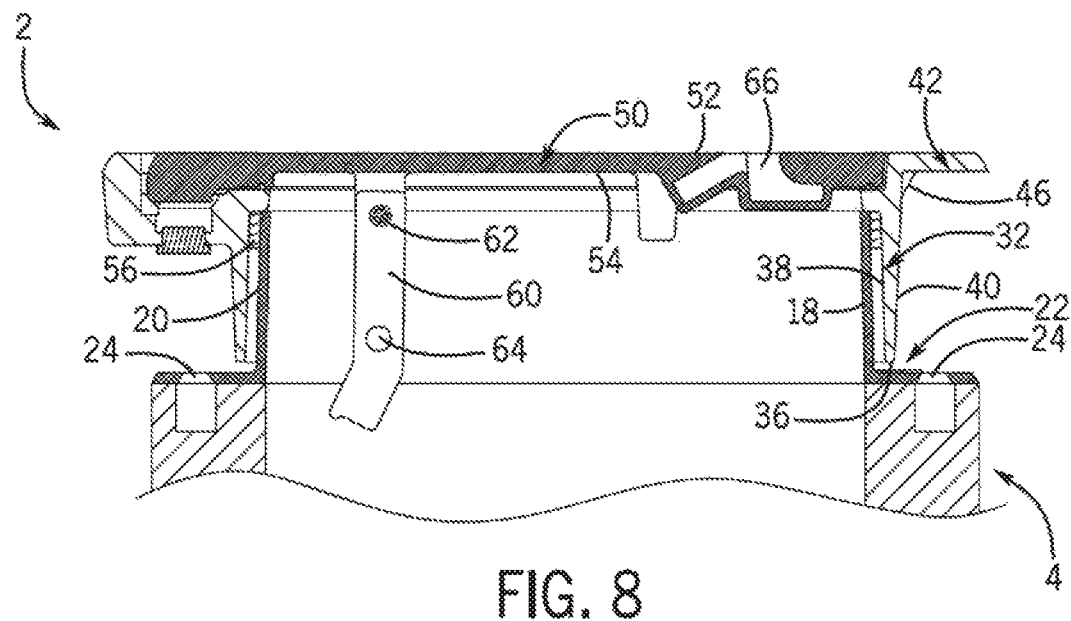
FIG. 8 is a cross-sectional view of the top frame with a hinged cover being installed on the base frame in the second position.
Figure 9:
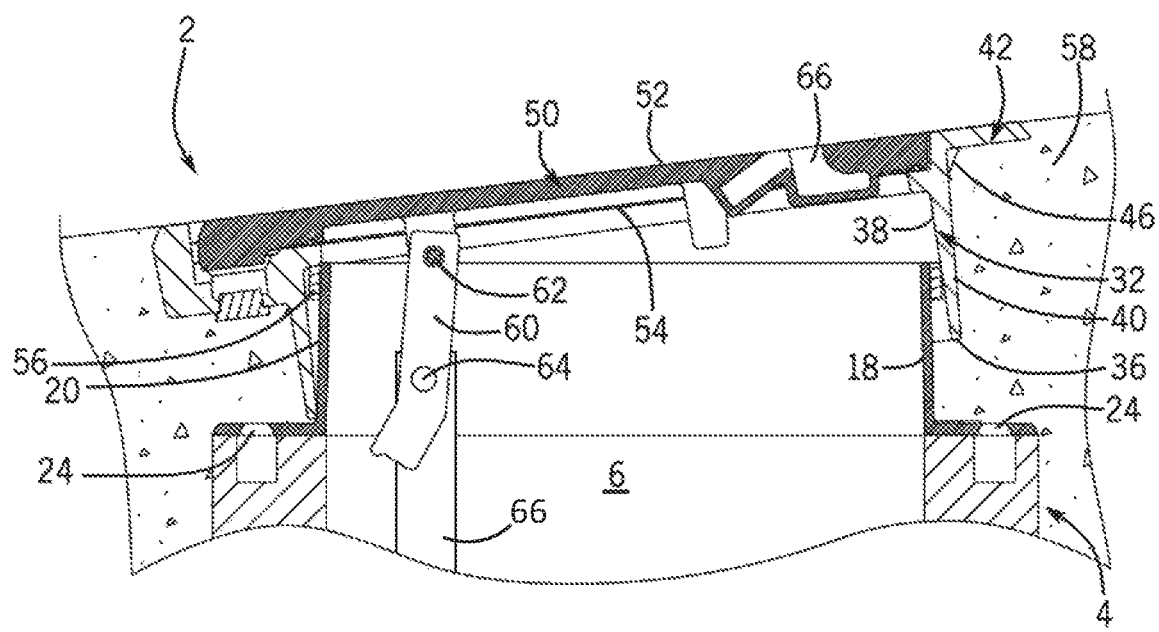
FIG. 9 is a cross-sectional view of the top frame with a hinged cover being installed on the base frame in the tilted orientation.

Referring now to FIGS. 7-9, the manhole cover assembly 2 is shown according to another exemplary embodiment. The top frame 30 includes a hinged cover 50 that is pivotally coupled to the top frame 30. For example, a member 60 is pivotally coupled to the lower surface 54 of the cover 50 with a fastener 62 (e.g., bolt, pin, etc.). The member 60 may be coupled through an opening 64 or other structure to another portion of the top frame 30. In this configuration, the member 60 may serve as a linkage, such that the member 60 rotates about the opening 64 as the cover 50 is repositioned. According to another exemplary embodiment, the member 60 may be coupled to another structure in the manhole cover assembly 2. For the example, the member 60 may be coupled to the manhole structure 4, the base frame 10, or a ladder 66 disposed in the manhole structure 4. The member 60 may be held in a fixed orientation as the cover 50 is repositioned.

The upper surface 52 of the cover 50 defines an inset portion (e.g., cutout) forming a handle 66. A user may engage the handle 66 to lift the cover 50 in order to provide access through the manhole cover assembly 2 to the manhole structure 4. When the cover 50 is lifted, it may pivot, at least in part, about the fastener 62 in the member 60. The pivotal coupling between member 60 and the cover 50 enables the member 60 to be coupled to another structure in the manhole covers assembly 2, even as the top frame 30 is repositioned to an inclined orientation. This configuration enables the cover 50 to be installed in the manhole cover assembly 2 prior to the manhole cover assembly 2 being received (e.g., installed) on the manhole structure 4. As shown in FIGS. 7 and 8, the top frame 30 is in a substantially level orientation. As the top frame 30 is lowered onto the base frame 10 (e.g., moving from FIG. 7 to FIG. 8), the top frame 30 maintains a substantially level orientation and is not inclined relative to the member 60. Referring now to FIG. 9, as the top frame 30 is positioned in an inclined orientation, and the cover 50 is maintained in a closed position, the member 60 does not maintain an inclined orientation with the cover 50. In this configuration, the member 60 may have a substantially fixed (e.g., the same) orientation relative to the base frame 10 as when the top frame 30 was in a level orientation (e.g., as shown in FIGS. 7 and 8), although according to other exemplary embodiments, the member 60 may rotate in other directions as part of a linkage system.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. A manhole cover assembly, comprising:
   a base frame comprising a base body configured to engage a pavement structure;
   a top frame comprising:
      a top body disposed annularly about at least a portion of the base body; and
      a lip extending laterally inward from the top body;
   a cover received in the top frame proximate the lip; and
   a member pivotally coupled to the cover and pivotally coupled to the base frame, the member extending orthogonally away from the cover when the top body is disposed annularly about at least the portion of the base body.

2. The assembly of claim 1, wherein the member is pivotally coupled to a lower surface of the cover through a fastener.

3. The assembly of claim 1, wherein the member is pivotally coupled to the one of the top frame or the base frame through an opening formed in the member.

4. The assembly of claim 3, wherein the member is configured to rotate about the opening as the cover is repositioned.

5. The assembly of claim 3, wherein the member is configured to rotate about the opening as the top frame is inclined relative to the base frame.

6. The assembly of claim 1, wherein the member is coupled to a ladder.

7. The assembly of claim 1, further comprising a base flange extending laterally outward from the base body;
   wherein the top body engages the base flange.

8. A manhole cover assembly, comprising:
   a manhole structure;
   a base frame comprising a base body defining an outer surface diameter;
   a top frame disposed in a pavement structure, the top frame comprising:
      a top body disposed annularly about at least a portion of the base body, the top body defining an inner surface diameter greater than the outer surface diameter, the base body configured to engage the pavement structure when the top frame is disposed in the pavement structure; and
      a lip extending laterally inward from the top body;
   a cover received in the top frame proximate the lip; and
   a member pivotally coupled to the cover and pivotally coupled to one of the base frame or the manhole structure.

9. The assembly of claim 8, wherein the member is pivotally coupled to a lower surface of the cover through a fastener.

10. The assembly of claim 8, wherein the member is pivotally coupled to the one of the top frame, the base frame, or the pavement structure through an opening formed in the member.

11. The assembly of claim 10, wherein the member is configured to rotate about the opening as the cover is repositioned.

12. The assembly of claim 10, wherein the member is configured to rotate about the opening as the top frame is inclined relative to the base frame.

13. The assembly of claim 8, wherein the member is coupled to a ladder.

14. The assembly of claim 8, further comprising a base flange extending laterally outward from the base body;
   wherein the top body engages the base flange.

15. The assembly of claim 8, wherein the top body directly engages the pavement structure.

16. A method of installing a manhole cover assembly, comprising:
   providing a base frame, the base frame comprising a base body configured to engage a pavement structure and a base flange extending laterally outward from the base body;
   coupling the base flange to a manhole structure;
   providing a top frame, the top frame comprising a top body, a top flange extending laterally outward from the top body, and a cover received in the top body;
   providing a member pivotally coupled to the cover and pivotally coupled to one of the base frame or the manhole structure;
   positioning the top body annularly about the base body;
   inclining the top frame relative to the base frame;
   rotating the member as the top frame is inclined; and
   engaging the top frame with a gasket positioned between the top frame and the base frame to maintain the incline of the top frame.

17. The method of claim 16, wherein the member defines an opening for pivotally coupling the member to the one of the base frame, the top frame, or the manhole structure.

18. The method of claim 17, wherein the member is configured to rotate about the opening as the top frame is inclined.

19. The method of claim 17, wherein the member is configured to rotate about the opening as the cover is repositioned.

20. The method of claim 16, further comprising engaging the base flange with a lower end of the top body.

* * * * *